US010091415B2

(12) United States Patent
Awatani (10) Patent No.: US 10,091,415 B2
(45) Date of Patent: Oct. 2, 2018

(54) IMAGE PROCESSING APPARATUS, METHOD FOR CONTROLLING IMAGE PROCESSING APPARATUS, IMAGE PICKUP APPARATUS, METHOD FOR CONTROLLING IMAGE PICKUP APPARATUS, AND RECORDING MEDIUM

(71) Applicant: CANON KABUSHIKI KAISHA, Tokyo (JP)

(72) Inventor: Yoshio Awatani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 15/127,341

(22) PCT Filed: Mar. 26, 2015

(86) PCT No.: PCT/JP2015/060408
§ 371 (c)(1),
(2) Date: Sep. 19, 2016

(87) PCT Pub. No.: WO2015/147339
PCT Pub. Date: Oct. 1, 2015

(65) Prior Publication Data
US 2017/0134648 A1 May 11, 2017

(30) Foreign Application Priority Data

Mar. 28, 2014 (JP) .................................. 2014-069276
Mar. 25, 2015 (JP) .................................. 2015-062650

(51) Int. Cl.
*H04N 5/232* (2006.01)
*H04N 5/907* (2006.01)
(Continued)

(52) U.S. Cl.
CPC ......... *H04N 5/23229* (2013.01); *H04N 5/907* (2013.01); *H04N 9/07* (2013.01); *H04N 9/64* (2013.01)

(58) Field of Classification Search
CPC ........ H04N 5/23229; H04N 9/64; H04N 9/07; H04N 5/907
See application file for complete search history.

(56) References Cited

U.S. PATENT DOCUMENTS 5,963,255 A * 10/1999 Anderson .......... H04N 5/23241
320/135
6,031,999 A * 2/2000 Ogawa ..................... G03B 7/26
396/277
(Continued)

FOREIGN PATENT DOCUMENTS

EP 1679660 A1 7/2006
JP 2000-032308 A 1/2000
(Continued)

OTHER PUBLICATIONS

PCT/IB/326 (PCT Notification Concerning Transmittal of International Preliminary Report on Patentability).
(Continued)

*Primary Examiner* — Timothy J Henn
(74) *Attorney, Agent, or Firm* — Cowan, Liebowitz & Latman, P.C.

(57) ABSTRACT

An image processing apparatus, including an acquisition unit configured to acquire RAW data of a captured image, which is captured by an image pickup unit; a processing unit configured to perform a plurality of different image processing steps on the acquired RAW data in a step-wise manner; and a control unit configured to control the processing unit, wherein, when the processing unit performs the plurality of different image processing steps on the RAW data in the step-wise manner in real time during the image capturing by
(Continued)

the image pickup unit, the control unit controls the processing unit in accordance with operation statuses regarding the captured image to limit a stepwise execution of the plurality of different image processing steps, controls the processing unit to output the RAW data to which processing up to a limited step has been performed, and generates information indicating the limited step.

24 Claims, 6 Drawing Sheets

(51) Int. Cl.
*H04N 9/07* (2006.01)
*H04N 9/64* (2006.01)

(56) References Cited

U.S. PATENT DOCUMENTS

| | | | |
|---|---|---|---|
| 6,434,337 B1* | 8/2002 | Misawa | H04N 5/232 348/372 |
| 2004/0257462 A1 | 12/2004 | Goris et al. | |
| 2006/0164525 A1* | 7/2006 | Hosyuyama | G06T 11/60 348/239 |
| 2009/0232480 A1* | 9/2009 | Jendbro | G11B 27/034 386/224 |
| 2014/0098213 A1* | 4/2014 | Sato | G02B 21/367 348/79 |
| 2015/0293575 A1* | 10/2015 | Hampson | G06F 1/3212 713/323 |
| 2015/0381980 A1* | 12/2015 | Tsuchiya | H04N 19/176 375/240.02 |

FOREIGN PATENT DOCUMENTS

| | | |
|---|---|---|
| JP | 2001-309296 A | 11/2001 |
| JP | 2003-209737 A | 7/2003 |
| JP | 2006-196992 A | 7/2006 |
| JP | 2007-006125 A | 1/2007 |
| JP | 2011-244423 A | 12/2011 |
| JP | 2014-017641 A | 1/2014 |

OTHER PUBLICATIONS

PCT/IB/373 (PCT International Preliminary Report on Patentability).
PCT/ISA/237 (PCT Written Opinion of the International Searching Authority).
The above patent documents were cited in a European Search Report dated Oct. 12, 2017, that issued in the corresponding European Patent Application No. 15768877.1.
The foreign references 1-5 were cited in the International Search Report dated Jun. 23, 2015 of International Application No. PCT/JP2015/060408 dated Mar. 26, 2015.
The above foreign patent documents were cited in the May 16, 2017 Korean Office Action, without an English Translation, that issued in Korean Patent Application No. 10-2016-7029548.

* cited by examiner

IMAGE PROCESSING APPARATUS, METHOD FOR CONTROLLING IMAGE PROCESSING APPARATUS, IMAGE PICKUP APPARATUS, METHOD FOR CONTROLLING IMAGE PICKUP APPARATUS, AND RECORDING MEDIUM

CROSS-REFERENCE TO RELATED APPLICATIONS

This application claims priority to International Application No. PCT/JP2015/060408 filed on Mar. 26, 2015, the entire disclosure of which is hereby incorporated by reference.

TECHNICAL FIELD

The present invention relates to an image processing apparatus, a method for controlling an image processing apparatus, an image pickup apparatus, a method for controlling an image pickup apparatus, and a recording medium.

BACKGROUND ART

In an image pickup apparatus in a related art, raw image information (RAW image, RAW data) picked up by an image sensor is subjected to debayering (demosaicing) to be converted into signals including luminance and chrominance, and each of the signals is subjected to so-called development processing such as noise removal, optical distortion correction, and image optimization. Then, luminance signals and chrominance signals that have been subjected to the development processing are generally compressed and coded to be recorded on a recording medium.

Meanwhile, there also exists an image pickup apparatus capable of recording a RAW data. Despite an enormous amount of data required for recording, the RAW data has advantages in that an original image has minimized correction and degradation and can be edited after being captured, and is used by an experienced user by preference.

A configuration of the image pickup apparatus that records the RAW image is disclosed in PTL 1. In PTL 1, there is described the configuration in which a development parameter is recorded together with the RAW image, and the development parameter is used at the time of reproduction to develop and reproduce the RAW image.

CITATION LIST

Patent Literature

PTL 1: Japanese Patent Application Laid-Open No. 2011-244423

SUMMARY OF INVENTION

According to one aspect of an embodiment an image processing apparatus, including an acquisition unit configured to acquire RAW data of a captured image, which is captured by an image pickup unit; a processing unit configured to perform a plurality of different image processing steps on the acquired RAW data in a step-wise manner; and a control unit configured to control the processing unit, wherein, when the processing unit performs the plurality of different image processing steps on the RAW data in the step-wise manner in real time during the image capturing by the image pickup unit, the control unit controls the processing unit in accordance with operation statuses regarding the captured image to limit a stepwise execution of the plurality of different image processing steps, controls the processing unit to output the RAW data to which processing up to a limited step has been performed, and generates information indicating the limited step.

Further features of the present invention will become apparent from the following description of exemplary embodiments with reference to the attached drawings.

DESCRIPTION OF EMBODIMENTS

An image pickup apparatus in recent years includes an advanced image sensor and has a significantly increased number of pixels per image. Moreover, the number of images that can be captured successively per second tends to be increased. Therefore, processing amounts of respective processing steps constituting development processing on a RAW image, such as debayering, noise removal, and optical distortion correction are synergistically increased, and in order to perform the development processing in real time along with the image capturing, an enormous circuit and power consumption are expended. Due to occupation of a circuit by the development processing, a limitation in power consumption, and the like, there may be cases where high image capturing performance cannot be achieved.

On the other hand, with the configuration in which the RAW image is recorded without being developed as in PTL 1, the amount of processing during the image capturing is reduced, and as a result, it is expected that the image capturing performance as a camera is improved without being compromised by the development processing performed in parallel to the image capturing. Note, however, that the RAW image is recorded in a state of not being developed, and hence after the image capturing, some RAW development processing is necessary. However, as described above, in addition to the increases in image size and image data, when the time it takes for the RAW development processing after the image capturing is increased and a long time is required before the image is displayed, a user is stressed to impair convenience of the image pickup apparatus.

Now, embodiments of the present invention are described in detail with reference to the drawings.

Figure 1:
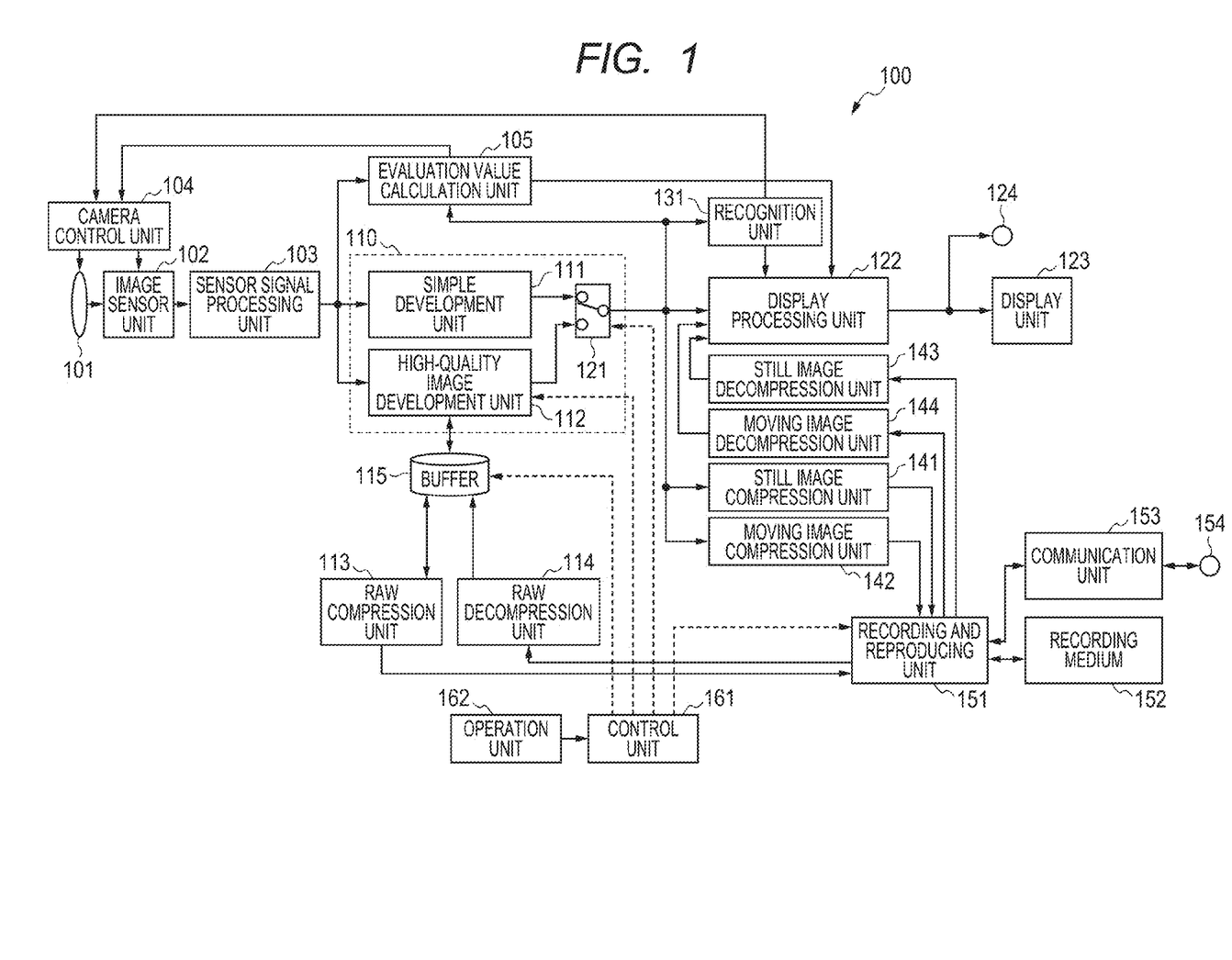
FIG. 1 is a block diagram illustrating a configuration example of an image pickup apparatus according to a first embodiment of the present invention.

FIG. 1 is a block diagram illustrating a configuration example of an image pickup apparatus according to a first embodiment of the present invention. An image pickup apparatus 100 illustrated in FIG. 1 not only records image data, which is obtained by capturing an image of a subject, on a recording medium, but also has a function of reproducing the image data from the recording medium and subjecting the image data to the development processing for display, and a function of transmitting and receiving the image data to and from an external apparatus or server (cloud), or the like. Therefore, when attention is focused on those functions, the image pickup apparatus according to this embodiment can be expressed as an image processing apparatus, a recording apparatus, a reproducing apparatus, a recording and reproducing apparatus, a communication apparatus, and the like.

In FIG. 1, a control unit 161 includes a central processing unit (CPU), and a memory configured to store a control program to be executed by the CPU, and controls processing operations of respective units of the image pickup apparatus 100. An operation unit 162 includes an input device, such as keys, buttons, or a touch panel, which is used by the user to give instructions to the image pickup apparatus 100. The control unit 161 detects an operation signal from the operation unit 162, executes the control program stored in the memory (not shown), and controls the units of the image pickup apparatus so that an operation corresponding to the operation signal is executed. A display unit 123 includes a liquid crystal display (LCD) or the like for displaying an image captured or reproduced in the image pickup apparatus 100, a menu screen, various types of information, and the like.

When an instruction to start an image capturing operation is issued by the operation unit 162, an optical image of the subject to be imaged is formed on an image sensor unit 102 by an imaging optical unit 101. Operations of the imaging optical unit 101 and the image sensor unit 102 during the image capturing are controlled by a camera control unit 104 based on results of calculating evaluation values such as an aperture, a focus, and camera shake, which are acquired by an evaluation value calculation unit 105, and subject information extracted by a recognition unit 131.

Figure 7:
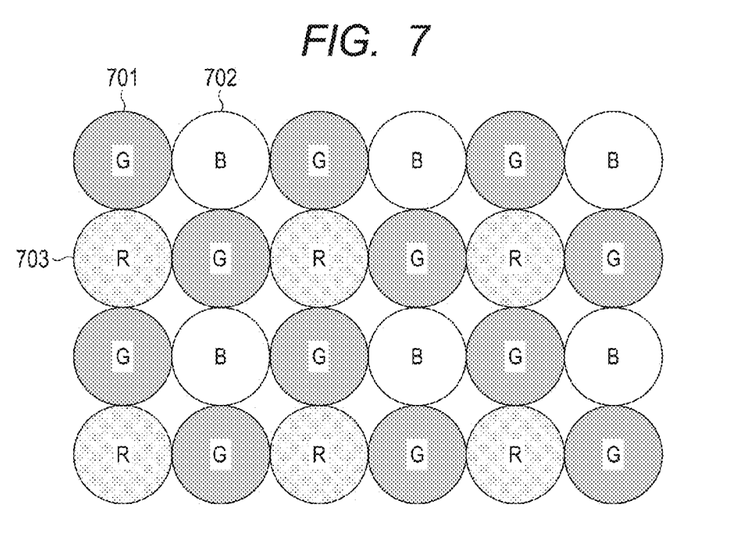
FIG. 7 is a diagram schematically illustrating an example of a pixel array of an image pickup element.

The image sensor unit 102 converts light beams that have been transmitted through red, green, and blue (RGB) color filters, which are arranged for each pixel, into electric signals. FIG. 7 is a diagram illustrating an example of the color filters arranged on an imaging surface of the image sensor unit 102, and represents a pixel array of an image handled by the image pickup apparatus 100. As illustrated in FIG. 7, red (R) 703, green (G) 701, and blue (B) 702 are arranged in a mosaic pattern for each pixel to form a structure in which sets of one red pixel, one blue pixel, and two green pixels for every 4 pixels in 2 rows and 2 columns are arranged regularly. Such an arrangement of the pixels is generally called "Bayer array".

The electric signals obtained by photoelectrically converting the optical image by the image sensor unit 102 are subjected to recovery processing on a pixel value by a sensor signal processing unit (acquisition unit) 103. The recovery processing includes processing, on the pixel values of missing pixels and less reliable pixels of the image sensor unit 102, of interpolating values of pixels to be recovered using neighboring pixel values (a correction processing on a defective pixel value due to a defect of a pixel), and subtracting a predetermined offset value in order to compensate for a black level of an output of the image sensor unit 102. In this embodiment, an electrical signal (data) from output from the image sensor unit 102 to output from the sensor signal processing unit 103 is referred to as "RAW data (RAW image)", which means a raw (undeveloped) image. Various correction processes to be performed by the sensor signal processing unit 103 may be well-known processes to be performed before the developing process to be performed in a development unit 110 provided in a rear stage. Otherwise, only a part of them may be performed by the sensor signal processing unit 103.

The RAW data is subjected to the development processing in a development unit 110. The development unit 110 includes a plurality of different development processing units, which are a simple development unit 111 as a first development unit and a high-quality image development unit 112 as a second development unit. The development unit 110 further includes a switch unit 121 configured to select between outputs of the simple development unit 111 and the high-quality image development unit 112. Both the simple development unit 111 and the high-quality image development unit 112 subject the RAW data to the debayering (demosaicing) to convert the RAW data into signals including luminance and chrominance, and perform so-called development processing such as the removal of noise contained in each signal and the optical distortion correction to optimize the image.

In particular, the high-quality image development unit 112 is capable of handling an image having a larger number of pixels than the simple development unit 111, and performs the processing steps at high accuracy. The high accuracy allows a developed image with higher image quality than that obtained by the simple development unit 111 to be obtained, but on the other hand, a processing load becomes large. Therefore, the high-quality image development unit 112 in this embodiment is not designed specifically for the development in real time along with the image capturing, but is configured to be capable of taking time for distributed processing after the image capturing. Thus, taking time later for high-quality image development but not at the time of image capturing can suppress increases (peaks) in a circuit scale and power consumption to low levels. Moreover, the high-quality image development unit 112 is a processing unit configured to subject the RAW data, which is acquired from the sensor signal processing unit 103, to a plurality of different image processing steps in a stepwise manner.

On the other hand, the simple development unit 111 is lower in image quality than the high-quality image development unit 112, but is configured to have a smaller amount of processing relating to the development than the high-quality image development so that the development processing may be performed at high speed during the image capturing. In this manner, the simple development unit 111 has a small processing load, and hence is used for the real-time development along with the image capturing operation. The switch unit 121 is switched by the control unit 161 in accordance with a control depending on an operation instructed by the user via the operation unit 162 or a current operation mode.

For example, the simple development unit 111 limits the image size after the development to 2 million pixels or less, or restricting to limited processing steps or omitting relatively time-consuming signal processing such as the noise removal and optical distortion correction to realize speed up and simplification of the development processing. With the simple development unit 111 performing the processing after reducing the image size or partially limiting the functions of the development processing, the image pickup apparatus 100 can realize image capturing at the performance of, for example, 2 million pixels and 60 frames per second, with a small circuit scale and low power consumption.

Note that, this embodiment describes a configuration in which the simple development unit 111 and the high-quality image development unit 112 are independently present in the development unit 110, but a configuration in which one development unit switches the operation mode to exclusively perform the processing steps of the simple development and the high-quality image development is also encompassed by the present invention.

The image data on which the development processing has been performed by the development unit 110 is subjected to predetermined display processing by a display processing unit 122, and then displayed on the display unit 123. The image data on which the development processing has been performed may also be output via a video output terminal 124 to a display device that is externally connected. The video output terminal 124 includes, for example, a general-purpose interface such as a high-definition multimedia interface (HDMI: trademark) or a serial digital interface (SDI).

The image data on which the development processing has been performed by the development unit 110 is also supplied to the evaluation value calculation unit 105. The evaluation value calculation unit 105 calculates the evaluation values such as a focus state and an exposure state based on the RAW data output from the sensor signal processing unit 103 or the image data output from the development unit 110.

The image data on which the development processing has been performed by the development unit 110 is also supplied to the recognition unit 131. The recognition unit 131 has a function of detecting and recognizing the subject information in the image data. For example, the recognition unit 131 detects a face in the image represented by the image data, and in a case where a face is detected, outputs information indicating a position of the face and further performs authentication of a certain person based on information on a feature such as the face.

The image data on which the development processing has been performed by the development unit 110 is also supplied to a still image compression unit 141 and a moving image compression unit 142. In a case where the image data is to be compressed as a still image, the still image compression unit 141 is used. In a case where the image data is to be compressed as a moving image, the moving image compression unit 142 is used. Each of the still image compression unit 141 and the moving image compression unit 142 subjects the target image data to high-efficiency coding (compression coding) to generate image data having a compressed information amount, and converts the image data into an image file (still image file or moving image file). The Joint Photographic Experts Group (JPEG) or the like may be used for the compression of the still image, and the Moving Picture Experts Group (MPEG)-2, H.264, H.265, or the like can be used for the compression of the moving image.

In this embodiment, in the case where the image data output from the sensor signal processing unit 103 is referred to as "RAW data" and the image data output by the development unit 110 is referred to as "developed image", intermediate image data in a state in which the development processing is finished halfway inside the high-quality image development unit 112 is hereinafter referred to as "iRAW data". This term means the RAW data on which the development processing is finished halfway, and is short for "intermediate RAW data".

Figure 2A:
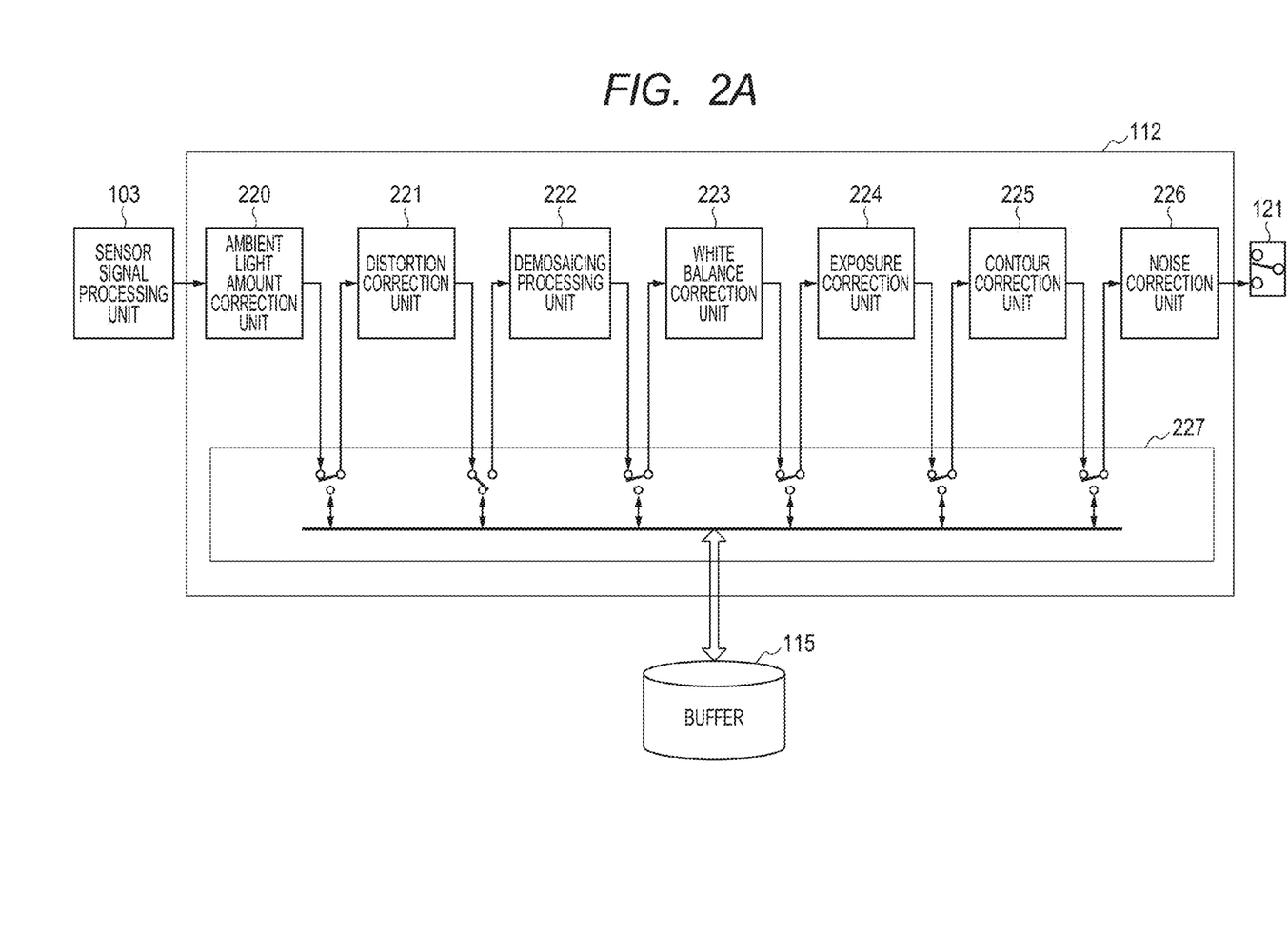
FIGS. 2A and 2B are detailed block diagrams of a part of the image pickup apparatus according to the first embodiment of the present invention.
Figure 2B:
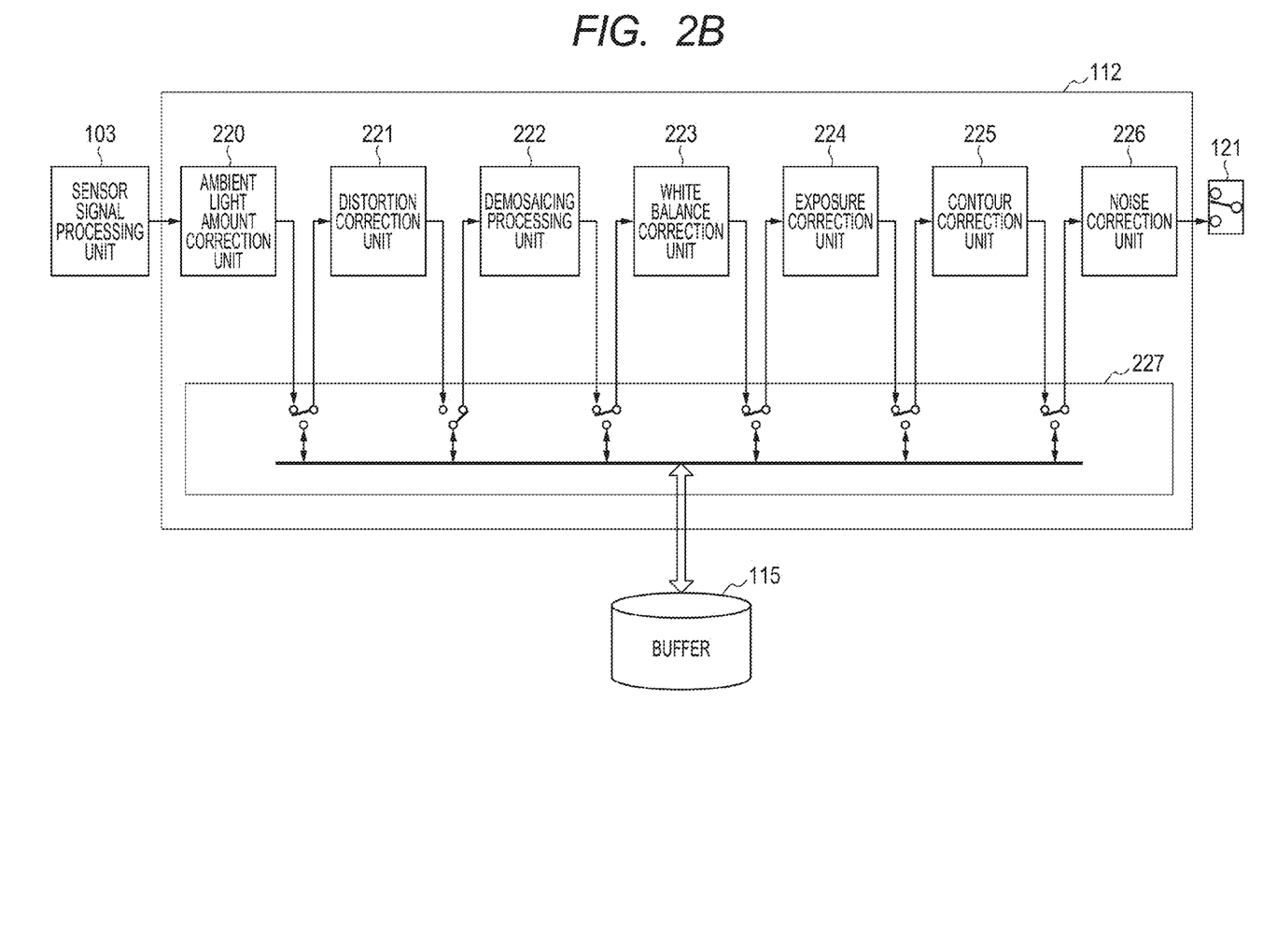

A detailed configuration of the high-quality image development unit 112 is illustrated in FIGS. 2A and 2B. In FIGS. 2A and 2B, the same parts as those in FIG. 1 are denoted by the same reference numerals. The high-quality image development unit 112 receives as an input the RAW data of the captured image from the sensor signal processing unit 103, and outputs to the switch unit 121 the image data on which the plurality of different image processing steps constituting the high-quality image development have been performed in the step-wise manner. The plurality of processing steps include various processing steps which are executed by image processing units such as an ambient light amount correction unit 220, a distortion correction unit 221, a demosaicing processing unit 222, a white balance correction unit 223, an exposure correction unit 224, a contour correction unit 225, and a noise correction unit 226. The above-mentioned iRAW data refers to image data that is an output of each of the image processing units.

The iRAW data output by each of the image processing units may be input to the following image processing unit on a subsequent stage, or may be written in a buffer 115 under the control of the control unit 161. Similarly, each of the image processing units may receive as its input the iRAW data output by the image processing unit on the previous stage, or the image data read from the buffer 115 under the control of the control unit 161. In other words, the control unit 161 controls the high-quality image development unit 112 as the processing unit configured to perform the plurality of different image processing steps on the acquired RAW data in the step-wise manner. This is a feature of this embodiment, and depending on various states such as the operation mode of the image pickup apparatus, the power consumption, the image size, and the user's instruction from the operation unit, the high-quality image development unit 112 can exchange the iRAW data therein with the buffer 115.

Note that, the data input to the high-quality image development unit 112 is the RAW data itself, but in a case where the data is treated as an internal signal after being input to the high-quality image development unit 112 once, the data is treated as the iRAW data for convenience.

A RAW compression unit 113 subjects the iRAW data stored in the buffer 115 to the high-efficiency coding using a technique such as wavelet transform or differential coding to convert the iRAW image into an iRAW file in a compressed state, and stores the iRAW file in the buffer (recording medium) 115. The iRAW file can be left in the buffer 115 to be read again, but after being stored in the buffer 115, may be moved to another recording medium to be recorded thereon (and be deleted from the buffer 115).

The iRAW file, and the still image file and the moving image file, which are to be described later, are recorded on a recording medium 152 by a recording and reproducing unit 151. The recording medium 152 is a built-in large-capacity memory or hard disk, a removable memory card, or the like.

The recording and reproducing unit 151 can also read the still image file, the moving image file, and the iRAW file from the recording medium 152.

The iRAW file read by the recording and reproducing unit 151 is decompressed by a RAW decompression unit 114 to restore the iRAW data, which is stored in the buffer 115. The recording and reproducing unit 151 can write and read various files to and from an external storage or server via a communication unit 153. The communication unit 153 has a configuration that is capable of accessing the Internet or an external device through wireless or wired communication, by using a communication terminal 154.

When a reproduction operation is started by the user via the operation unit 162, the recording and reproducing unit 151 acquires a desired file from the recording medium 152 or via the communication unit 153 and reproduces the file. If the file to be reproduced is an iRAW file, the recording and reproducing unit 151 sends the acquired iRAW file to the RAW decompression unit 114.

If the file to be reproduced is a still image file, the recording and reproducing unit 151 supplies the acquired still image file to a still image decompression unit 143. If the file to be reproduced is a moving image file, the recording and reproducing unit 151 supplies the acquired moving image file to a moving image decompression unit 144.

The still image decompression unit 143 decodes and decompresses the input still image file, or does nothing in a case where the file is already decompressed, and supplies the file as a reproduction image of the still image to the display processing unit 122. The moving image decompression unit 144 decodes and decompresses the input moving image file, or does nothing in a case where the file is already decompressed, and supplies the file as a reproduction image of the moving image to the display processing unit 122.

Figure 3:
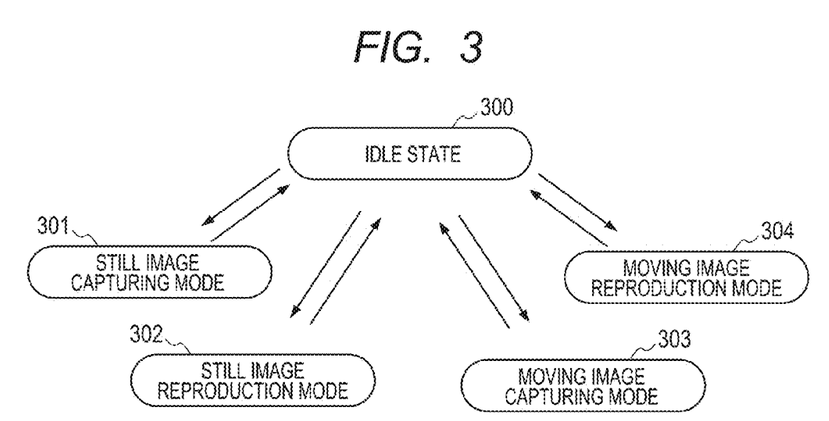
FIG. 3 is a diagram illustrating state transitions of the image pickup apparatus according to the first embodiment of the present invention.

Next, operation modes of the image pickup apparatus 100 according to this embodiment are described in detail with reference to the drawing. FIG. 3 is a state transition diagram illustrating transitions of the operation modes in the image pickup apparatus 100. Such transition of the modes is executed in response to a user operation instruction from the operation unit 162 or determination by the control unit 161, and the transition is made manually in response to an operation in one case and automatically in another case. As in FIG. 3, the image pickup apparatus 100 switches to one of four modes: a still image capturing mode (301), a still image reproduction mode (302), a moving image capturing mode (303), and a moving image reproduction mode (304) via an idle state (300) as appropriate for operation.

Referring to FIGS. 2A and 2B, the high-quality image development unit 112 is described in detail. In FIGS. 2A and 2B, the ambient light amount correction unit 220 corrects a tendency in the imaging optical unit 101 for an image to be brighter toward a center of a lens and darker toward a periphery. The distortion correction unit 221 corrects distortion such as barrel distortion generated due to lens characteristics in the imaging optical unit 101.

The demosaicing processing unit 222 performs image processing on an image of the Bayer array as illustrated in FIG. 7 so that each pixel has R, G, and B signals. While each pixel has information on only one color before being subjected to the processing by the demosaicing processing unit 222, each pixel after the demosaicing has information on R, G, and B colors, and hence generally has an increased amount of data. For example, the amount of data increases 3 times. The white balance correction unit 223 adjusts the balance of R, G, and B to accurately correct white with respect to light sources having various color temperatures. The exposure correction unit 224 performs a gain operation or offset superimposition on each pixel to control brightness of the entire image.

The contour correction unit 225 subjects the image to a spatial low-pass filter (LPF) or high-pass filter (HPF) to intensify or blur the contour of the subject. The noise correction unit 226 subjects the image to the LPF to suppress noise in the entire image or a specific area, or combines a plurality of images by superimposition to suppress noise in the image. Note that, in this embodiment, the order of the functional units illustrated in FIGS. 2A and 2B is not limited to this example. In addition, the types of the image processing executed by the high-quality image development unit 112 are not limited to this example. For example, in addition to those illustrated here, the high-quality image development unit 112 may have a function of performing a color space conversion processing for converting an RGB image into luminance and chrominance signals, a function of performing gamma processing, a high dynamic range (HDR) enhancement function, an electronic vibration isolation function for a shake correction which is performed by changing a segmenting position of the image, and the like.

A buffer interface (I/F) unit 227 exchanges data on images to be recorded and reproduced between the buffer 115 and each of the functional units 220 to 226. Inputs and outputs of the functional units in the high-quality image development unit 112 are connected to switches in the buffer I/F unit 227. The switches provided in the buffer I/F unit 227 are for supplying the RAW data processed in the high-quality image development unit 112 to at least one of function unit for a next processing step or the buffer 115. The control unit 161 controls those switches as to whether the input of each functional unit receives the iRAW data output by the functional unit in the previous stage or the iRAW data stored in the buffer 115 via the buffer I/F unit 227.

In FIGS. 2A and 2B, the buffer I/F unit 227 is an I/F for allowing each of the functional units 220 to 226 to record in the recording medium 152 or the like or reproduce an image via the buffer 115.

Note that, although not illustrated in FIGS. 2A and 2B, the functional units 220 to 226 also use the buffer 115 as a temporary memory space in performing respective signal processing operations, and for this purpose, are capable of exchanging data with the buffer 115 irrespective of the control of the buffer I/F unit 227.

For example, in a case where the image pickup apparatus 100 is in an image capturing mode, the control unit 161 controls the switches in the buffer I/F unit 227 to a state illustrated in FIG. 2A, and the RAW data output from the sensor signal processing unit 103 is subjected to processing up to ambient light amount correction and distortion correction in the high-quality image development unit 112. The thus-processed iRAW data is stored once in the buffer 115, and then recorded on the recording medium 152. As in this example, during the image capturing, to which step the development processing is executed in the high-quality image development unit 112 before writing the iRAW data in the buffer 115 is controlled by the control unit 161.

Moreover, in this example, the processing of the high-quality image development unit 112 is finished at the distortion correction processing by the distortion correction unit 221, and hence there is no need to operate the functional units from the demosaicing processing unit 222 to the noise correction unit 226. For the functional units 222 to 226, power supplies to the functional units may be turned off or an internal operation clock may be stopped to actively suppress the power consumption.

On the other hand, in a case where the image pickup apparatus 100 is in a reproduction mode, the switches in the buffer I/F unit 227 are controlled to a state illustrated in FIG. 2B, and the iRAW data read from the recording medium 152 is controlled by the buffer I/F unit 227 to be input to the demosaicing processing unit 222 of the high-quality image development unit 112 and receive the subsequent development processing steps.

Meanwhile, in the processing of the high-quality image development in the related art, in order to reduce RAW development time during the reproduction, the development processing in the subsequent stage (exposure correction processing, contour correction processing, noise correction processing, and the like) is generally performed as much as possible during the image capturing. However, in this embodiment, as described above, depending on the image capturing mode of the image pickup apparatus (including image pickup unit and image processing unit), setting of image capturing conditions (zoom, focus, exposure, ISO sensitivity, or the like), the power consumption, the operation status such as processing load, the image size, information concerning RAW data such as a S/N ratio, and the user's instruction from the operation unit, or the like, the step-wise execution of the development processing is adaptively controlled to optimize the RAW data processing in the image capturing operation.

In the case where the image pickup apparatus 100 is in the moving image capturing mode, or even in the still image capturing mode, at a time of successive image capturing or in a case where the number of pixels of the recorded image is larger than a predetermined reference, an amount of image data is increased significantly by the demosaicing processing unit 222 as described above. Therefore, when the image processing for the development is performed in real time processing along with the image capturing, the processing time becomes longer than a predetermined period of time, which may degrade image capturing performance. In order to avoid such case, in this embodiment, the high-quality image development unit 112 adaptively controls connections of the switches included in the buffer I/F unit 227 to control to which step the processing is performed. For example, the connections of the switches are controlled as illustrated in FIGS. 2A and 2B to restrict an amount of processing of the high-quality image development unit 112 to the execution of the image processing up to the processing of the distortion correction unit 221 so that the iRAW data is passed to the buffer 115 (output from the high-quality image development unit 112) after the distortion correction. As a result, the processing time of the high-quality image development unit 112 in the real time operation can be suppressed to maintain the image capturing performance.

The above-mentioned example has been a description of a case where, in the image capturing mode, it can be determined in advance that the image data to be handled is large, such as the case of the moving image capturing mode, or even in the still image capturing mode, at the time of successive image capturing or in the case where the number of pixels of the recorded image is large, and the control of the high-quality image development unit 112 is limited to a specific development processing step.

On the other hand, without limiting to the method of limiting the image data that is being captured to the specific development processing step, the processing may be changed adaptively depending on a remaining amount of data processing in the high-quality image development unit 112. Such an adaptive control configuration (method) is described by means of examples.

A first example of the adaptive control on the processing steps in the high-quality image development unit 112 is a control in a case where a data processing speed of the high-quality image development unit 112 falls behind an amount of RAW data output from the sensor signal processing unit 103 and the buffer 115 may overflow.

As described above, the functional units 220 to 226 also use the buffer 115 as a temporary memory space in performing respective signal processing operations.

Moreover, the details of the actual signal processing of the functional units 220 to 226 may change adaptively depending on the state of each image.

For example, the noise correction unit 226 determines a state of signal to noise (S/N) of the image to increase an amount of signal processing for reducing noise in a case where the S/N of the image is low (case where noise is large because the image is captured in a scene with a small amount of light, or the like), and on the other hand, to decrease the amount of signal processing in a case where the S/N of the image is high.

As described above, in a case where the amount of data processing of each functional unit is dynamically changed depending on the state of the image, for example, the control unit 161 determines whether the buffer 115 is likely to overflow because the amount of data processing has changed, and in a case where the buffer 115 is likely to overflow, a control is performed so that the iRAW data in a step before development processing with a heavy load is performed is recorded on the recording medium 152 via the buffer 115 or on the external storage or server via the communication unit 153, and that the development processing with the heavy load is not performed to avoid accumulation of data in the buffer 115. Thereafter, depending on the state of the image (electrical signal, data), in a case where a margin for overflow has been generated in the buffer 115, a control is performed to write the iRAW data on which the development processing up to the steps with the heavy load has been performed in the buffer 115. In this manner, the control unit 161 adaptively controls to which step the processing is to be performed based on a data amount of the RAW data and expected overflow of the buffer 115 due to the processing speed depending on the image.

Note that, as described above, in the case where the steps of the development processing are changed adaptively, for example, the steps of the development processing are controlled for each captured image in the case of the still image, and for each frame in one stream in the case of the moving image. Therefore, in a case where the remaining development processing is to be performed on the iRAW data when the image pickup apparatus 100 according to this embodiment is in the reproduction mode, there is a need to determine, for each frame, to which step the development processing has been finished. In consideration of this, a file of the RAW data or the iRAW data according to this embodiment is configured as follows.

Figure 4:
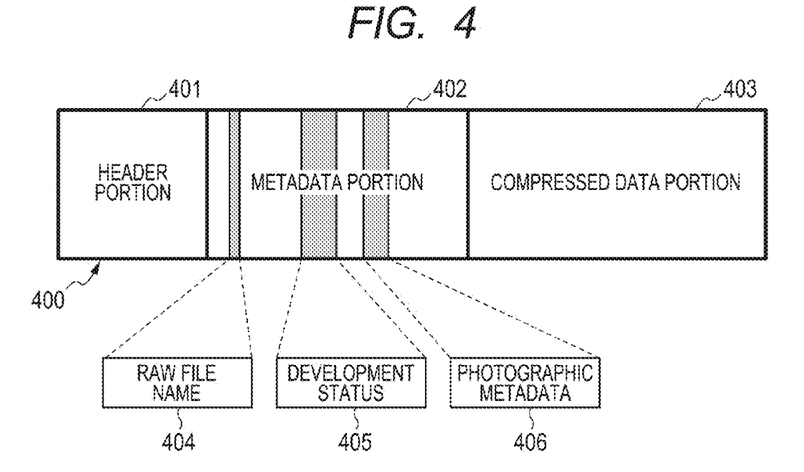
FIG. 4 is a diagram illustrating a configuration example of a RAW file recorded by the image pickup apparatus according to the first embodiment of the present invention.

FIG. 4 is a diagram illustrating a configuration example of a RAW file. A RAW file 400 illustrated in FIG. 4 includes a header portion 401, a metadata portion 402, and a compressed data portion 403. The header portion 401 includes an identification code indicating that this file is in a RAW file format, or the like. The compressed data portion 403 includes compressed data of the iRAW data that has been subjected to the high-efficiency coding.

The metadata portion 402 includes information 404 on a file name of the iRAW file, and also includes development status information 405 indicating the step up to which the development processing has been finished by the high-quality image development unit 112. The metadata portion 402 further includes the evaluation values and the subject information detected by the evaluation value calculation unit 105 and the recognition unit 131, respectively, and photographic metadata 406 including information at the time of image capturing from the imaging optical unit 101 and the image sensor unit 102 (for example, lens type identification information and sensor type identification information). In addition, although not illustrated, the metadata portion 402 may further include an image generated by the simple development unit 111 during the image capturing, an identification code of the recording medium on which the RAW file is recorded, path information on a folder on which the RAW file is recorded, and the like.

As described above, the file contains the development status information as metadata, with the result that it is possible to discriminate to which step the development processing has been finished on the iRAW data. The same applies to second to sixth examples to be described below. Note that, the above-mentioned structures of various files according to this embodiment are merely examples, and a configuration compatible with standards such as Design rule for Camera File system (DCF) or Exchangeable Image File format (EXIF) may be used.

Next, a second example of the adaptive control on the processing steps in the high-quality image development unit 112 is described. In a case where large image data is to be subjected to the development processing, the power consumption is increased to reduce image capturing time. Therefore, the control unit 161 monitors a remaining amount of a battery, which is added internally or externally to the image pickup apparatus 100 to supply electric power, and performs a control to change the steps of the development processing of the high-quality image development unit 112 depending on the remaining amount. With this configuration, the power consumption of the image pickup apparatus 100 may be controlled to extend time during which images can be captured (image capturing possible time) as necessary. It should be understood that, in a case where the image pickup apparatus 100 is connected to an AC outlet or the like and is in a situation in which the electric power can be continuously supplied thereto, a control may be performed to perform as many steps of the development processing as possible.

Subsequently, a third example of the adaptive control on the processing steps in the high-quality image development unit 112 is described. The image pickup apparatus 100 according to this embodiment records the iRAW data during the image capturing, and hence the remaining development processing needs to be executed at a time of reproduction. Some users may prefer to leave everything to the image pickup apparatus for the details of the development processing to be performed during the reproduction, that is, usage in a so-called "auto mode", but the image pickup apparatus prepares some setting modes in advance, from which the user makes a selection in other cases. The setting modes include, for example, a mode in which a person's face is recognized to optimize the white balance and the exposure of the subject to be photographed, a mode in which, in a case where subjects to be photographed are sceneries, color saturation is automatically adjusted for each scenery, and the like. Moreover, especially with an experienced camera user, the user often sets development conditions in detail by himself/herself. In particular, the white balance and the like are often finely adjusted to develop a desired image. Therefore, the control unit 161 is configured to perform controls so that the above-mentioned setting modes set by the user and processing parameters for the development processing, which are set by the user in detail, are learned to change the processing steps of the high-quality image development unit 112 in accordance therewith. For example, if the user frequently adjusts the white balance, the development processing of the high-quality image development unit 112 during the image capturing is stopped immediately before the white balance correction unit 223 to record the iRAW data.

Next, a fourth example of the adaptive control on the processing steps in the high-quality image development unit 112 is described. In the case where the image data is exchanged with an external device through communication via the communication unit 153 and the communication terminal 154, there is assumed a case where a data transfer speed at which the image data can be exchanged is changed depending on a communication status with the external device. It is desired not to transmit large data when the data transfer speed is low. A data size of the iRAW data output from the high-quality image development unit 112 is changed by the functional units 220 to 226, and hence the steps of the development processing of the high-quality image development unit 112 may be changed depending on the communication status.

Next, a fifth example of the adaptive control on the processing steps in the high-quality image development unit 112 is described. The case where the steps of the development processing of the high-quality image development unit 112 are determined depending on the state of each image has been described above, but in a case where an aperture of a lens is changed by an operation of the user or a case where a zoom magnification of the lens is changed, for example, processing loads of the distortion correction unit 221, the exposure correction unit 224, and the like may change transiently. Changing the steps of the development processing of the high-quality image development unit 112 in such case is also contemplated by the present invention.

Moreover, the phrase "by an operation of the user" has been used in the above description, but without limiting to the operation of the user, determining a spontaneous operation state by the camera in an auto operation mode or the like to change the steps of the development processing of the high-quality image development unit 112 is contemplated by the present invention.

Next, a sixth example of the adaptive control on the processing steps in the high-quality image development unit 112 is described.

For example, the order of the functional units illustrated in FIGS. 2A and 2B is not limited to the example, and the functional units may be constructed in an order with which the image data tends to increase.

This is because, in the case where the image data is apparently increased or the case where the image data is expected to be increased as described above, it is more effective means to change the steps of the development processing of the high-quality image development unit 112 and record the iRAW data on the recording medium 152 so that the processing load of the high-quality image development unit 112 is not increased.

Moreover, the method of realizing the functional units in the high-quality image development unit 112 may be hardware processing with a dedicated circuit, or software processing with a processor or the like.

In general, the software processing is lower in operation speed than the hardware processing. Therefore, in the case where the steps of the development processing of the high-quality image development unit 112 are changed depending on the state of the image (electrical signal, RAW data) or the operation statuses of the camera as in the present invention, a state in which the development processing has performed up to the hardware processing may be treated as the iRAW data.

The control examples described above may not only be used independently as the adaptive control on the processing steps in the high-quality image development unit 112, but also be combined as appropriate, with a control to fix the processing steps included, and prioritized to determine the processing steps (output timing of the iRAW data). It should be understood that the above six control examples are illustrative, and other control components in accordance with the configuration of the image pickup apparatus 100 or the characteristics of the subject to be photographed may be employed. Moreover, each of those control components may be installed in advance as the control program to be executed by the control unit 116, or may be installed later as an update program so that a control component may be added or changed.

According to this embodiment described above, in the image pickup apparatus in which the RAW data is recorded during the image capturing, there can be provided an image processing apparatus and an image processing method in which intermediate RAW data (iRAW data) is recorded to allow the speed of the RAW development processing after the image capturing to be increased.

According to this embodiment, there can be provided the image pickup apparatus having a configuration of recording and reproducing the RAW data, with which the convenience is improved over the related art.

Figure 5:
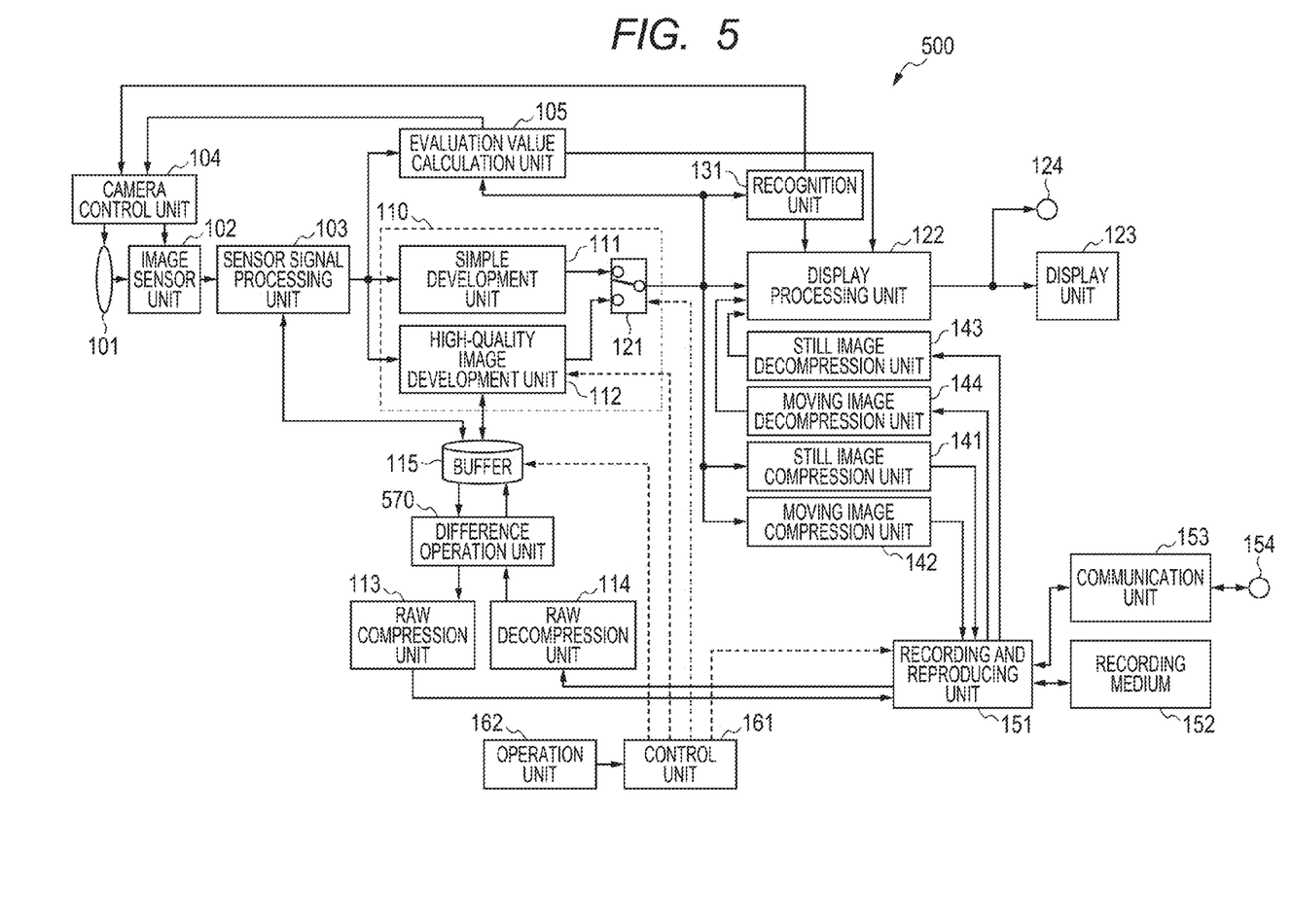
FIG. 5 is a block diagram illustrating a configuration example of an image pickup apparatus according to a second embodiment of the present invention.

Next, a second embodiment of the present invention is described with reference to FIG. 5. FIG. 5 is a block diagram illustrating a configuration example of an image pickup apparatus 500 according to this embodiment. In FIG. 5, the same functional units as those of the image pickup apparatus 100 according to the first embodiment illustrated in FIG. 1 are denoted by the same reference numerals, and a description thereof is omitted.

A difference from the image pickup apparatus 100 according to the first embodiment is that a difference operation unit 570 is inserted between the buffer 115 and each of the RAW decompression unit 114 and the RAW compression unit 113. The difference operation unit 570 is a difference unit configured to generate difference data between the RAW data on which processing up to the step limited by the control unit has been performed, and the RAW data on which processing in any one of the steps before the limited step has been performed.

In the case of the first embodiment, the iRAW data with which the processing up to a certain step has been finished cannot be restored to a state before the processing. For example, in a case where the user wants to readjust the white balance at the time of reproduction for the iRAW data on which the development processing by the noise correction unit 226 in FIGS. 2A and 2B has been finished, the mere input of the above-mentioned iRAW data to the white balance correction unit 223 may be insufficient in some cases. This is because, in some cases, missing data is generated in the course of the operation of the development processing so that the data becomes irreversible. Therefore, in such case, it is preferred to restore the iRAW data to the state of the RAW data output from the sensor signal processing unit 103 and execute the development processing from the start by the high-quality image development unit 112. However, in order to achieve the above-mentioned operation, it is necessary to ensure that the iRAW data can be used to restore the RAW data at the step of the output of the sensor signal processing unit 103.

Now, a configuration for restoring the RAW data is described. In FIG. 5, the RAW data output by the sensor signal processing unit 103 is written in the buffer 115. The iRAW data output by the high-quality image development unit 112 is also written in the buffer 115. The difference operation unit 570 performs a difference operation on the RAW data and the iRAW data in the buffer 115 in units of a pixel, for example. In this embodiment, the difference data is referred to as "dRAW data". Note that, the difference operation unit 570 generates information indicating to which step the iRAW data can be restored by using the dRAW data.

The iRAW data and the dRAW data are respectively subjected to the high-efficiency coding using the technique such as the wavelet transform and the differential coding by the RAW compression unit 113 to be converted into files in the compressed state, and recorded on the recording medium 152 by the recording and reproducing unit 151. Alternatively, the iRAW data and the dRAW data are recorded on the external storage or server via the communication unit 153.

Figure 6:
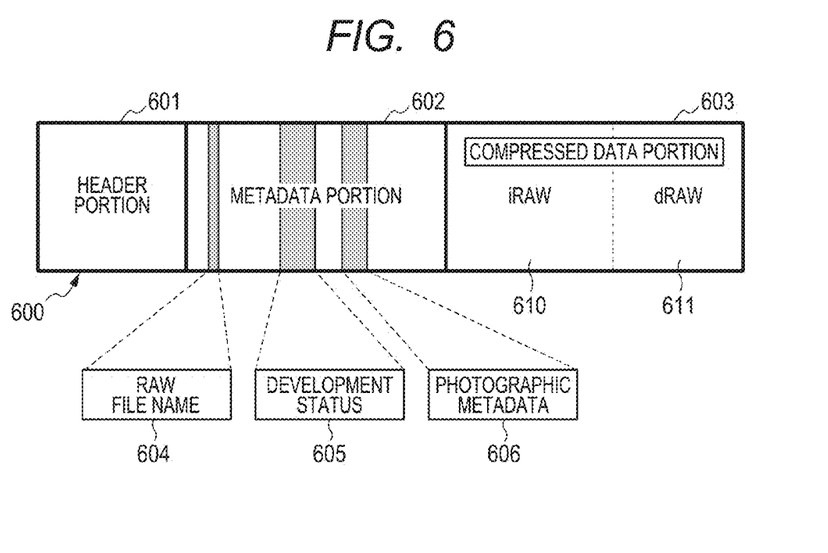
FIG. 6 is a diagram illustrating a configuration example of a RAW file recorded by the image pickup apparatus according to the second embodiment of the present invention.

FIG. 6 illustrates an example of a structure of the RAW file which is recorded on the recording medium 152, or on the external storage or server via the communication unit 153 in this embodiment. Referring to FIG. 6, the structure of the RAW file according to this embodiment is described.

A RAW file 600 illustrated in FIG. 6 includes a header portion 601, a metadata portion 602, and a compressed data portion 603. The header portion 601 includes an identification code indicating that this file is in a RAW file format, or the like. The compressed data portion 603 includes iRAW data 610 and dRAW data 611 that have been subjected to the high-efficiency coding. The iRAW data and the dRAW data are recorded as a pair in this manner, to thereby hold the correspondence relationship between the iRAW data and the dRAW data.

The metadata portion 602 includes information 604 on a file name of the iRAW file. The metadata portion 602 also includes status information 605 indicating the step up to which the development processing has been executed by the high-quality image development unit 112.

The metadata portion 602 further includes information indicating to which step the iRAW data can be restored by using the dRAW data. Moreover, the metadata portion 602 includes the evaluation values and the subject information detected by the evaluation value calculation unit 105 and the recognition unit 131, respectively, and photographic metadata 606 including information at the time of image capturing from the imaging optical unit 101 and the image sensor unit 102 (for example, lens type identification information and sensor type identification information). In addition, although not illustrated, the metadata portion 602 may further include an image generated by the simple development unit 111 during the image capturing, an identification code of the recording medium on which the RAW file is recorded, path information on a folder on which the RAW file is recorded, and the like.

Note, however, that in the above description, the dRAW data has been the difference between the RAW data and the iRAW data, but the dRAW data may be a difference between different versions of the iRAW data. For example, in a case where the white balance adjustment is performed again on the iRAW data on which the processing up to the noise correction unit 226 has been performed, the data to be restored by the difference data may rather be the iRAW data on which the processing up to the demosaicing processing unit 222 has been performed than the RAW data. This is because the need to execute the processing from the ambient light amount correction unit 220 to the demosaicing processing unit 222 is eliminated, and hence an amount of executed development processing is reduced. In this case, it is desired that the dRAW data be difference data between the iRAW data output by the noise correction unit 226 and the iRAW data output by the demosaicing processing unit 222. In this manner, the dRAW data at each processing step executed by the high-quality image development unit 112, or at a predetermined processing step may be recorded.

Each of the above-mentioned embodiments is only an example for implementing the present invention, and the technical scope of the present invention should not be interpreted in a limited way based on the above-mentioned embodiments. In other words, the present invention can be implemented in various forms without departing from the technical ideas or the main features thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-069276, filed Mar. 28, 2014, and Japanese Patent Application No. 2015-062650, filed Mar. 25, 2015 which are hereby incorporated by reference wherein in their entirety.

The invention claimed is:

1. An image processing apparatus, comprising:
at least one processor that executes computer instructions or a circuit operates as:
an acquisition unit configured to acquire RAW data, which is captured by an image pickup unit;
a processing unit configured to perform a plurality of different image processing steps on the acquired RAW data in a step-wise manner; and
a control unit configured to control the processing unit, and configured to limit a stepwise execution of the plurality of different image processing steps to be performed by the processing unit, and configured to generate information indicating a limited step limited by the control unit,
wherein the control unit limits the stepwise execution of the plurality of different image processing steps to be performed by the processing unit in accordance with at least any one of the RAW data, an operation status of an apparatus including the image pickup unit when capturing an optical image corresponding to the RAW data, and an operation status of the processing unit when processing the RAW data,
wherein the control unit adaptively limits the stepwise execution of the plurality of different image processing steps in accordance with any one of a data amount and a noise amount of the RAW data acquired by the acquisition unit.

2. The image processing apparatus according to claim 1, wherein the at least one processor that executes computer instructions or a circuit further operates as a difference unit configured to generate difference data between the RAW data on which processing up to the step limited by the control unit has been performed and RAW data on which processing in any one of steps before the limited step has been performed,
wherein the difference unit generates information on a step before the limited step regarding the generation of the difference data, and
wherein the any one of the steps before the limited step includes a step in which the processing unit starts executing the plurality of different image processing steps.

3. The image processing apparatus according to claim 2, further comprising a buffer unit configured to store the RAW data on which the image processing up to the step limited by the control unit has been performed and the RAW data on which the image processing in the any one of the steps before the limited step has been performed,
wherein the difference unit generates the difference data from the RAW data stored in the buffer unit.

4. The image processing apparatus according to claim 3, wherein the processing unit includes a switch for supplying RAW data processed in the processing unit to at least one of processing in a next step or the buffer unit, and
wherein the control unit controls switching of the switch in accordance with the operation statuses.

5. The image processing apparatus according to claim 1, wherein the control unit adaptively limits the stepwise execution of the plurality of different image processing steps in accordance with at least any one of the operation statuses including an image capturing mode, an image capturing possible time, and a setting of an image capturing condition as the operation status of the apparatus including the image pickup unit when capturing the optical image corresponding to the RAW data.

6. The image processing apparatus according to claim 1, wherein the control unit adaptively limits the stepwise execution of the plurality of different image processing steps in accordance with a processing parameter of the processing unit configured to process the RAW data as the operation status of the processing unit when processing the RAW data.

7. The image processing apparatus according to claim 1, wherein the control unit adaptively limits the stepwise execution of the plurality of different image processing steps in accordance with a remaining amount of a battery configured to supply an electric power to the image processing apparatus.

8. The image processing apparatus according to claim 1, further comprising:
a buffer unit configured to store the RAW data on which the processing up to the step limited by the control unit has been performed and the RAW data on which the processing in the any one of the steps before the limited step has been performed, and wherein the at least one processor that executes computer instructions or the circuit further operates as:

a recording unit configured to record RAW data on which the processing up to the step limited by the control unit has been performed, which is stored in the buffer unit, on a recording medium, wherein the recording unit generates an image file including at least the RAW data on which the image processing up to the step limited by the control unit has been performed and information indicating the limited step, and records the generated image file on the recording medium.

9. The image processing apparatus according to claim 8, wherein the at least one processor that executes computer instructions or a circuit further operates as a difference unit configured to generate difference data between the RAW data on which processing up to the step limited by the control unit has been performed and RAW data on which processing in any one of steps before the limited step has been performed, wherein the image file further includes processing parameters of the image processing up to the step limited by the control unit, difference data generated by the difference unit, and information indicating a step before the limited step regarding the generation of the difference data.

10. The image processing apparatus according to claim 1, wherein the plurality of different image processing steps executed by the processing unit in the step-wise manner include at least one of demosaicing processing or white balance correction processing.

11. The image processing apparatus according to claim 1, wherein the plurality of different image processing steps executed by the processing unit in the step-wise manner include at least one of ambient light amount correction processing, distortion correction processing, brightness correction processing, or noise correction processing.

12. The image processing apparatus according to claim 9, wherein the at least one processor that executes computer instructions or a circuit further operates as a reproduction unit configured to reproduce the image file which is recorded on the recording medium by the recording unit, wherein the processing unit performs, on the RAW data on which the processing up to the step limited by the control unit has been performed, which is stored in the reproduced image file, processing in steps after the step limited by the control unit based on the information indicating the limited step and the processing parameters of the processing up to the step limited by the control unit, which are stored in the reproduced image file.

13. The image processing apparatus according to claim 12, wherein the reproduction unit restores, based on the RAW data on which the processing up to the step limited by the control unit has been performed and the difference data, which are stored in the reproduced image file, RAW data on which processing in the step before the limited step has been performed, which is used in generating the difference data, and wherein the processing unit performs any one of the plurality of different image processing on the restored RAW data in accordance with the information indicating the step before the limited step regarding the generation of the difference data.

14. The image processing apparatus according to claim 1, wherein the RAW data is an electrical signal output from the image pickup unit, on which at least any one of a correction processing on a defective pixel value due to a defect of a pixel of the image pickup unit and a correction processing of a black level is performed.

15. A method for controlling an image processing apparatus, the image processing apparatus including:

at least one processor that executes computer instructions or a circuit operates as:

a processing unit configured to perform a plurality of different image processing steps on the RAW data picked up by an image pickup unit; and a control unit configured to control the processing unit, and configured to limit a stepwise execution of the plurality of different image processing steps to be performed by the processing unit, the method comprising:

acquiring the RAW data;

performing, by the processing unit, at least a part of the plurality of different image processing steps on the RAW data in a step-wise manner; and generating, by the control unit, information indicating a step of which the stepwise execution of the image processing steps performed by the processing unit is limited, wherein, in the performing at least the part of the plurality of different image processing steps, the control unit limits the stepwise execution of the plurality of different image processing steps to be performed by the processing unit in accordance with at least any one of the RAW data, an operation status of the image pickup unit when capturing the optical image corresponding to the RAW data, and an operation status of the processing unit when processing the RAW data, wherein the control unit adaptively limits the stepwise execution of the plurality of different image processing steps in accordance with any one of a data amount and a noise amount of the RAW data acquired by the acquisition unit.

16. A non-transitory computer-readable storage medium storing a program for controlling an image processing apparatus capable of processing RAW data, which is captured by an image pickup unit, the program causing a computer to function as:

an acquisition unit configured to acquire the RAW data;

a processing unit configured to perform a plurality of different image processing steps on the acquired RAW data in a step-wise manner; and a control unit configured to control the processing unit, and configured to limit a stepwise execution of the plurality of different image processing steps to be performed by the processing unit, and configured to generate information indicating a limited step limited by the control unit, wherein the control unit limits the stepwise execution of the plurality of different image processing steps to be performed by the processing unit in accordance with at least any one of the RAW data, an operation status of the image pickup unit when capturing the optical image corresponding to the RAW data, and an operation status of the processing unit when processing the RAW data, wherein the control unit adaptively limits the stepwise execution of the plurality of different image processing steps in accordance with any one of a data amount and a noise amount of the RAW data acquired by the acquisition unit.

17. An image pickup apparatus, comprising:
an image pickup unit configured to capture an optical image of a subject to be imaged, and configured to output an electrical signal;
at least one processor that executes computer instructions or a circuit operates as:
   a processing unit configured to perform a plurality of different image processing steps in a step-wise manner on the electrical signal output from the image pickup unit; and
   a control unit configured to control the processing unit, and configured to limit a stepwise execution of the plurality of different image processing steps to be performed by the processing unit, and configured to generate information indicating a limited step limited by the control unit,
   wherein the control unit limits the stepwise execution of the plurality of different image processing steps to be performed by the processing unit in accordance with at least any one of the electrical signal, an operation status of the image pickup unit when capturing the optical image corresponding to the electrical signal, and an operation status of the processing unit when processing the electrical signal,
   wherein the control unit adaptively limits the stepwise execution of the plurality of different image processing steps in accordance with any one of a data amount and a noise amount of the RAW data acquired by the acquisition unit.

18. An image processing apparatus, comprising:
at least one processor that executes computer instructions or a circuit operates as:
   an acquisition unit configured to acquire RAW data, which is captured by an image pickup unit;
   a processing unit configured to perform a plurality of different image processing steps on the acquired RAW data in a step-wise manner, the plurality of different image processing steps including at least one of demosaicing processing, white balance correction processing, ambient light amount correction processing, distortion correction processing, brightness correction processing, a color space conversion processing, and noise correction processing; and
   a control unit configured to control the processing unit, and configured to limit a stepwise execution of the plurality of different image processing steps to be performed by the processing unit, and configured to generate information indicating a limited step limited by the control unit,
   wherein the control unit limits the stepwise execution of the plurality of different image processing steps to be performed by the processing unit in accordance with at least any one of the RAW data, an operation status of the image pickup unit when capturing the optical image corresponding to the RAW data, and an operation status of the processing unit when processing the RAW data,
   wherein the control unit adaptively limits the stepwise execution of the plurality of different image processing steps in accordance with any one of a data amount and a noise amount of the RAW data acquired by the acquisition unit.

19. An image pickup apparatus, comprising:
an image pickup unit configured to capture an optical image of a subject to be imaged, and configured to output an electrical signal;
at least one processor that executes computer instructions or a circuit operates as:
   a processing unit configured to perform a plurality of different image processing steps in a step-wise manner on the electrical signal output from the image pickup unit, the plurality of different image processing steps including at least one of demosaicing processing, white balance correction processing, ambient light amount correction processing, distortion correction processing, brightness correction processing, a color space conversion processing, and noise correction processing; and
   a control unit configured to control the processing unit, and configured to limit a stepwise execution of the plurality of different image processing steps to be performed by the processing unit, and configured to generate information indicating a limited step limited by the control unit,
   wherein the control unit limits the stepwise execution of the plurality of different image processing steps to be performed by the processing unit in accordance with at least any one of the electrical signal, an operation status of the image pickup unit when capturing the optical image corresponding to the electrical signal, and an operation status of the processing unit when processing the electrical signal,
   wherein the control unit adaptively limits the stepwise execution of the plurality of different image processing steps in accordance with any one of a data amount and a noise amount of the RAW data acquired by the acquisition unit.

20. An image pickup apparatus, comprising:
an image pickup unit configured to capture an optical image of a subject to be imaged, and configured to output an electrical signal;
at least one processor that executes computer instructions or a circuit operates as:
   a processing unit configured to perform a plurality of different image processing steps in a step-wise manner on the electrical signal output from the image pickup unit; and
   a control unit configured to control the processing unit, and configured to limit a stepwise execution of the plurality of different image processing steps to be performed by the processing unit, and configured to generate information indicating a limited step limited by the control unit,
   wherein the control unit limits the stepwise execution of the plurality of different image processing steps to be performed by the processing unit in accordance with an operation status regarding the electrical signal,
   wherein the control unit adaptively limits the stepwise execution of the plurality of different image processing steps in accordance with any one of a data amount and a noise amount of the RAW data acquired by the acquisition unit.

21. A method for controlling an image processing apparatus, the image processing apparatus including:
at least one processor that executes computer instructions or a circuit operates as:

a processing unit configured to perform a plurality of different image processing steps on the RAW data picked up by an image pickup unit; and
a control unit configured to control the processing unit, and configured to limit a stepwise execution of the plurality of different image processing steps to be performed by the processing unit,
the method comprising:
acquiring the RAW data of a captured image;
performing, by the processing unit, at least a part of the plurality of different image processing steps on the RAW data in a step-wise manner, the plurality of different image processing steps including at least one of demosaicing processing, white balance correction processing, ambient light amount correction processing, distortion correction processing, brightness correction processing, a color space conversion processing, and noise correction processing; and
generating, by the control unit, information indicating a step of which the stepwise execution of the image processing steps performed by the processing unit is limited,
wherein, in the performing at least the part of the plurality of different image processing steps, the control unit limits the stepwise execution of the plurality of different image processing steps to be performed by the processing unit in accordance with at least any one of the RAW data, an operation status of the image pickup unit when capturing the optical image corresponding to the RAW data, and an operation status of the processing unit when processing the RAW data,
wherein the control unit adaptively limits the stepwise execution of the plurality of different image processing steps in accordance with any one of a data amount and a noise amount of the RAW data acquired by the acquisition unit.

22. A non-transitory computer-readable storage medium storing a program for controlling an image processing apparatus capable of processing RAW data, which is captured by an image pickup unit,
the program causing a computer to function as:
an acquisition unit configured to acquire the RAW data;
a processing unit configured to perform a plurality of different image processing steps on the acquired RAW data in a step-wise manner, the plurality of different image processing steps including at least one of demosaicing processing, white balance correction processing, ambient light amount correction processing, distortion correction processing, brightness correction processing, a color space conversion processing, and noise correction processing; and
a control unit configured to control the processing unit, and configured to limit a stepwise execution of the plurality of different image processing steps to be performed by the processing unit, and configured to generate information indicating a limited step limited by the control unit,
wherein the control unit limits the stepwise execution of the plurality of different image processing steps to be performed by the processing unit in accordance with at least any one of the RAW data, an operation status of the image pickup unit when capturing the optical image corresponding to the RAW data, and an operation status of the processing unit when processing the RAW data,
wherein the control unit adaptively limits the stepwise execution of the plurality of different image processing steps in accordance with any one of a data amount and a noise amount of the RAW data acquired by the acquisition unit.

23. A method for controlling an image pickup apparatus, the image pickup apparatus including:
an image pickup unit configured to capture an optical image of a subject to be imaged, and configured to output an electrical signal;
at least one processor that executes computer instructions or a circuit operates as:
a processing unit configured to perform a plurality of different image processing steps in a step-wise manner on the electrical signal output from the image pickup unit; and
a control unit configured to control the processing unit, and configured to limit a stepwise execution of the plurality of different image processing steps to be performed by the processing unit,
the method comprising:
performing, by the processing unit, at least a part of the plurality of different image processing steps in a step-wise manner; and
generating, by the control unit, information indicating a step of which the stepwise execution of the image processing steps performed by the processing unit is limited,
wherein, in the performing at least the part of the plurality of different image processing steps, the control unit limits the stepwise execution of the plurality of different image processing steps to be performed by the processing unit in accordance with an operation status regarding the electrical signal,
wherein the control unit adaptively limits the stepwise execution of the plurality of different image processing steps in accordance with any one of a data amount and a noise amount of the RAW data acquired by the acquisition unit.

24. A non-transitory computer-readable storage medium storing a program for controlling an image processing apparatus, the image processing apparatus including:
an image pickup unit configured to capture an optical image of a subject to be imaged, and configured to output an electrical signal;
at least one processor that executes computer instructions or a circuit operates as:
a processing unit configured to perform a plurality of different image processing steps in a step-wise manner on the electrical signal output from the image pickup unit; and
a control unit configured to control the processing unit, and configured to limit a stepwise execution of the plurality of different image processing steps to be performed by the processing unit,
the program causing a computer to function as:
an acquisition unit configured to acquire the RAW data;
a processing unit configured to perform a plurality of different image processing steps on the electrical signal in a step-wise manner; and
a control unit configured to control the processing unit, and configured to limit a stepwise execution of the plurality of different image processing steps to be performed by the processing unit, and configured to generate information indicating a limited step limited by the control unit,
wherein the control unit limits the stepwise execution of the plurality of different image processing steps to be performed by the processing unit in accordance with an operation status regarding the electrical signal, wherein the control unit adaptively limits the stepwise execution of the plurality of different image processing steps in accordance with any one of a data amount and a noise amount of the RAW data acquired by the acquisition unit.

* * * * *